Figure 1:
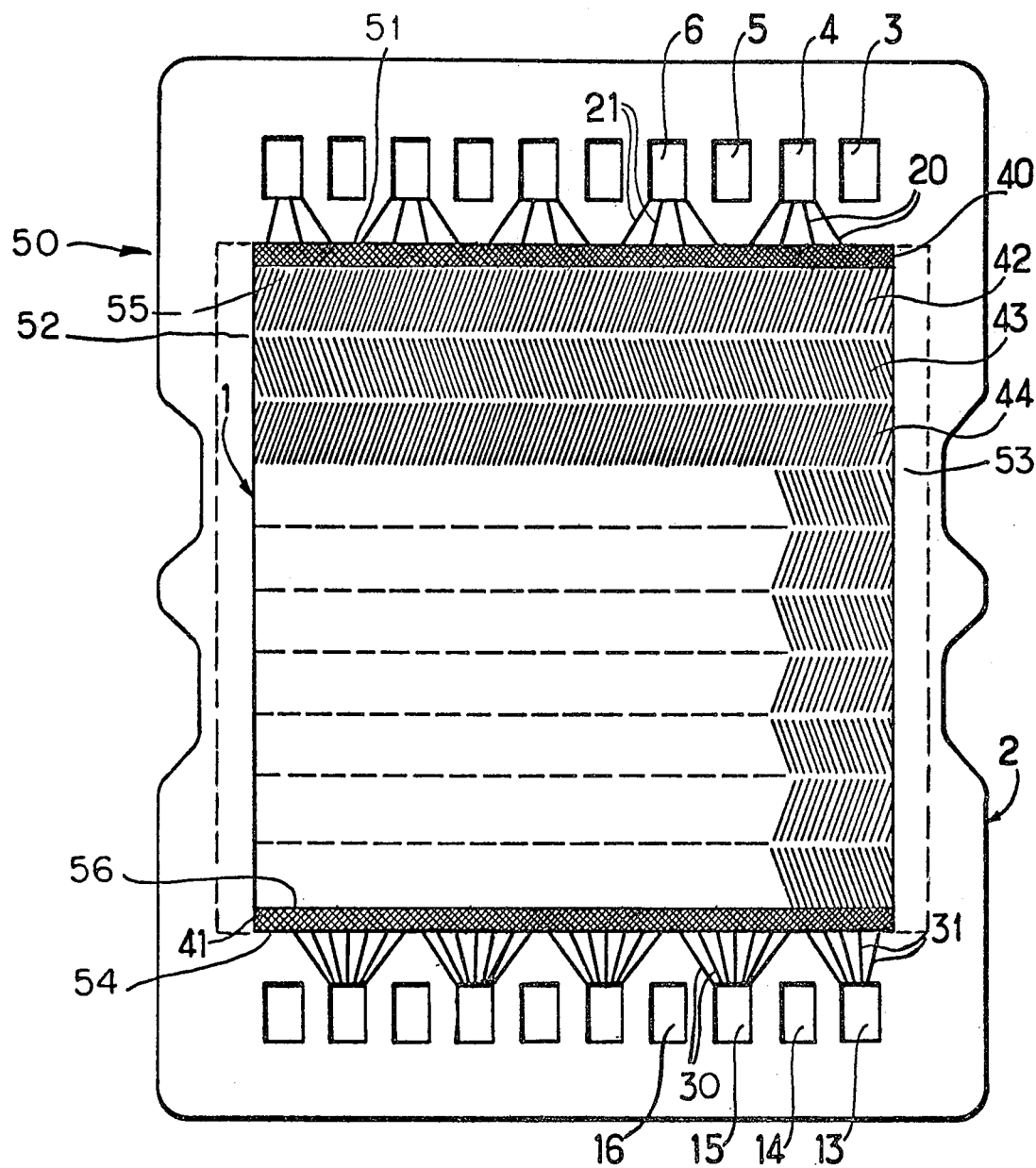

United States Patent
Warszawski et al.

[11] 3,901,731
[45] Aug. 26, 1975

[54] THIN SHEET APPARATUS FOR SUPPLYING AND DRAINING LIQUID

[75] Inventors: Bernard Warszawski, Paris; Bernard Verger, Essonne; Philippe Demange, Chatenay-Malabry, all of France

[73] Assignee: Societe Generale de Constructions Electriques et Mecaniques (ALSTHOM), Paris, France

[22] Filed: Jan. 4, 1974

[21] Appl. No.: 430,784

Related U.S. Application Data

[62] Division of Ser. No. 226,502, Feb. 15, 1972, Pat. No. 3,814,631.

[30] Foreign Application Priority Data
Feb. 15, 1971 France .............................. 71.5117

[52] U.S. Cl. ................. 136/86 R; 137/599; 55/443; 165/80; 204/240
[51] Int. Cl. ......................................... H01m 27/00
[58] Field of Search .......... 136/86 R, 86 D, 120 FC; 137/599; 55/443; 165/80; 204/240, 264, 276

[56] References Cited
UNITED STATES PATENTS
3,814,631  6/1974  Warszawski ................. 136/120 FC

*Primary Examiner*—John H. Mack
*Assistant Examiner*—H. A. Feeley
*Attorney, Agent, or Firm*—Flynn & Frishauf

[57] ABSTRACT

Thin sheet apparatus having a central area and a frame area around the central area. The frame area contains supply orifices and drainage orifices. The frame area contains a plurality of micro-channels leading from each of the supply orifices toward the central area. The plurality of microchannels leading from each orifice diverge from each other in the direction away from the orifice.

4 Claims, 2 Drawing Figures

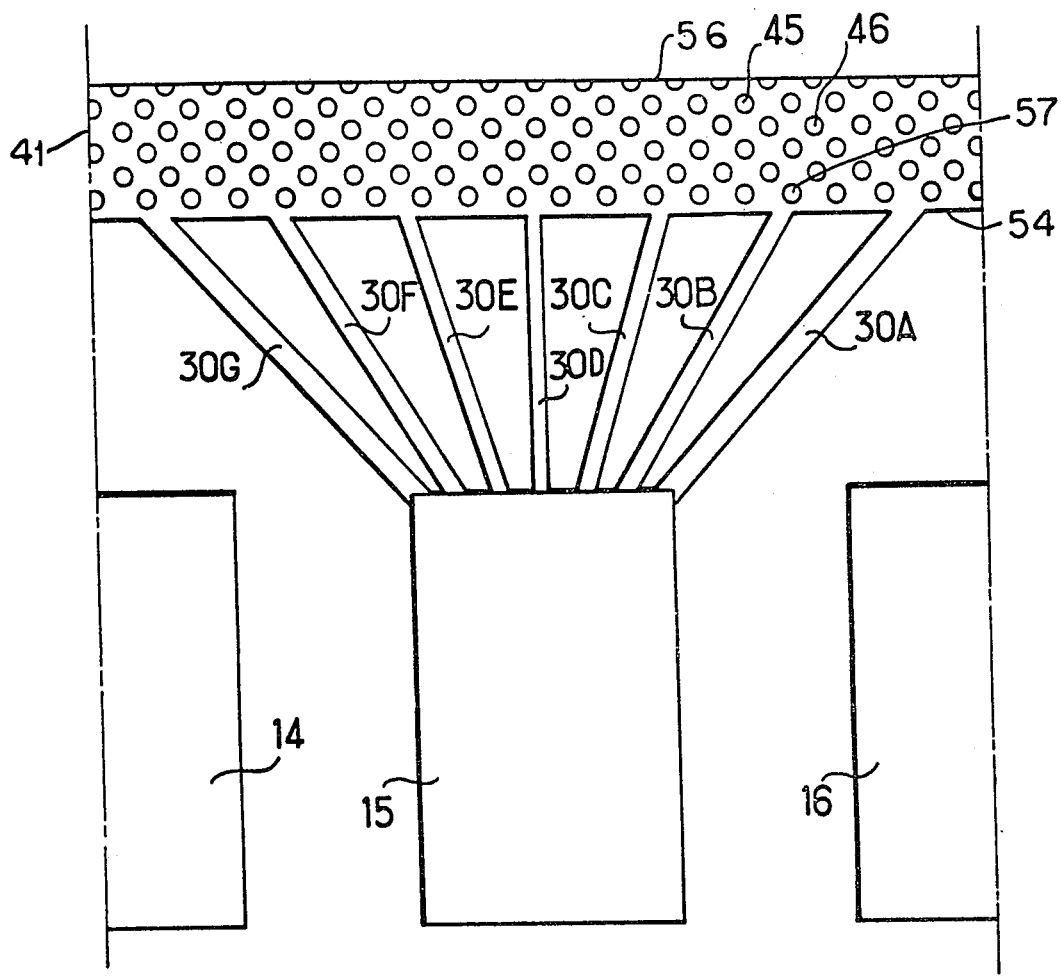

THIN SHEET APPARATUS FOR SUPPLYING AND DRAINING LIQUID

This is a division, of application Ser. No. 226,502, filed Feb. 15, 1972 now U.S. Pat. No. 3,814,631.

Cross references: U.S. Pat. Nos. 3,513,032; 3,516,866; 3,518,122; 3,530,003; 3,764,391; 3,690,954; 3,746,578; and 3,755,000.

The present invention relates to improved structures for supplying or draining liquid to or from the surface of a thin sheet. Although such devices may have broad applicability, for example in filters, dialysers, and heat exchangers, it is contemplated that their immediate use will be as an electrode structure in batteries and fuel cells particularly the type disclosed in U.S. Pat. No. 3,530,003 and said applications Ser. No. 70,636 now U.S. Pat. 3,764,391 and Ser. No. 119,797 now U.S. Pat. 3,759,413. The disclosure of each of the patents and patent applications referred to hereinbefore under the title "Cross references" is hereby incorporated by reference.

Fuel cells in which a reactant is dissolved or otherwise carried in an electrolyte have additionally been described and proposed in French Pat. No. 1,564,864 of Mar. 12, 1968. The foregoing French and U.S. patents describe structures which provide compact fuel cells of substantial output. In general these structures are a stack of individual thin plates or sheets forming electrodes, preferably bi-polar and separated by semi-permeable diaphragms. The fuel cell includes end plates for collecting electric current. The electrodes are held in frames, or are otherwise formed with openings in their marginal portions, as well as ducts or microgrooves extending from the marginal portions to the faces of the electrodes to carry electrolytic fluid and reactant from a supply to the electrodes to wash across the face of the electrodes from one marginal portion supplying the electrolyte and reactant to the opposed marginal portion in which the electrolyte and spent reactant is collected. The fuel cell includes a system of discharge channels connected with or through one of the said marginal portions of the electrode. The electrolyte which washes the face of the electrode may contain one or more reactants which may be dissolved or emulsified or otherwise carried in the electrolyte. Commonly, different reactants will be applied across each face of the preferred bi-polar electrodes.

The said French patent No. 1,564,864 discloses micro-channels connecting the supply orifices with the face of the electrode and also discloses micro-channels connecting the drainage orifices with the face of the electrode. The micro-channels disclosed are positioned parallel to each other and perpendicular to the edge of the electrode. It is an object of the present invention to provide an improvement over the prior art supply and drainage systems including that disclosed in said patent. It is an object to provide improvement in the distribution of the liquid from the supply system to the electrode surface. It is also an object to provide better distribution of the spent electrolyte when it is collected in the drainage system. It is also an object to provide apparatus which minimizes the unavoidably present shunt currents of the electrodes which are believed to cause cathodic reactions involving deposition of metallic ions which may clog channels and also to cause anodic reactions which may result in perforations. As a consequence of the foregoing it is the further object of the present invention to provide an improved apparatus resulting in longer useful service life.

SUBJECT MATTER OF THE PRESENT INVENTION

The invention provides a framed electrode having a thin sheet electrode surrounded with a frame. The frame is flat and preferably an insulating plastic. The frame contains supply orifices in one side and drainage orifices in another side. Preferably the drainage orifices are on the side opposite the supply orifices. A plurality of micro-channels lead from each of the orifices toward the electrode. The plurality of micro-channels leading from each of the orifices comprises a group of micro-channels. The micro-channels in each group diverge from each other in the direction away from said orifice. They are preferably symmetrical about a plane through the center of the orifice and perpendicular to the side of the electrode.

The frame contains a fluid distribution area, preferably substantially rectangular in shape, between the micro-channels and the surface of the electrode. The fluid distribution area contains a series of projections, preferably staggered and equidistant from each other.

The bottom surface of said fluid distribution area from which the projections protrude is preferably a flat surface on a level with the bottom of the micro-channels which abut the fluid distribution area.

The distance between adjacent micro-channels in the same group along the line where the micro-channels abut the fluid distribution area, is preferably equal.

The framed electrode preferably is formed by molding the frame around a preformed electrode. The electrode preferably has a rim on all four edges of the electrode surface. Two of the opposed rims are preferably of the same width as the fluid distribution areas and in the completed framed assembly underly the fluid distribution areas. The rims on the other two sides of the electrode are usually somewhat wider than the rims underlying the fluid distribution areas.

The present invention also includes fuel cells comprising an assembly of the stacked electrodes of the present invention alternating with semi-permeable thin sheet diaphragms. The fuel cells contain duct means interconnecting with the side (marginal) portions of said electrodes enabling flow of feed electrolyte and spent electrolyte respectively lengthwise of the stack of electrodes.

The invention will be described by way of example with reference to the accompanying drawings, wherein:

FIG. 1 illustrates schematically, the framed electrode assembly.

FIG. 2 schematically illustrates an enlarged view of a fragment of the electrode of FIG. 1.

In the drawings, electrode 1 is a thin nonporous, goffered bi-polar electrode of the type described in said Ser. No. 123,110 and has a chevron surface configuration of the type described in said Ser. No. 70,636 now U.S. Pat. No. 3,764,391 and Ser. No. 203,773 now U.S. Pat. No. 3,755,000. The electrode 1 is molded into an insulating plastic frame 2. The frame 2 contains rectalinear orifices 3, 4, 5, 6, etc. along one side, and 13, 14, 15, 16, etc., along the opposite side. The electrode 1 and the insulating frame 2 together form the framed electrode assembly 50. The electrode 1 contains four borders which are covered on both sides by plastic sheet of frame 2. The plastic covering the borders secures the electrode 1 in the frame 2. Two opposed borders of the electrode 1, preferably, are coextensive with areas 40 and 41 of frame 2. The electrode 1 also contains opposed borders 52 and 53 shown in broken line outline in FIG. 1. Areas 40 and 41 are preferably narrower than borders 52 and 53. In the embodiment illustrated, the electrode is metal and the frame is a plastic sheet. The framed electrode assembly 50 could be formed of a single unitary sheet material, instead of the two piece electrode 1 and frame 2 assembly illustrated. This could be done by metalizing the electrode surface(s) on a plastic sheet.

A stack of electrodes 1 separated by semipermeable membranes comprise a fuel cell battery as disclosed in the said patents and patent applications referred to hereinbefore. When the electrodes 1 are stacked to form a cell or battery, the corresponding orifices in the adjacent electrode frame assembly are superimposed to form supply channels and drainage channels for the electrolyte. In the illustrated framed electrode assembly 50, the alternate openings 4, 6, etc. are used for supplying electrolyte containing a fuel reagent (oxidizing or reducing in nature) to the surface of electrode 1. The electrolyte then passes over the surface of electrode 1 being constrained between the surface of electrode 1 and the adjacent semi-permeable membrane. When the electrode 1 is a part of a stack of a battery or fuel cell battery, components of the electrolyte undergo a chemical reaction and form decomposition products. The electrolyte containing these decomposition products is referred to as the "spent" electrolyte. The spent electrolyte then drains into the area 41 and into collecting channels, i.e., 31, 30, etc. and then into alternate orifices 13, 15, etc. which are part of the drainage duct system. The alternate supply openings 3, 5, are used for supplying an electrolyte (usually charged with another reagent) to the opposite surface of the bi-polar electrode. The corresponding drainage system and drainage orifices 14, 16, etc. serve to collect the spent electrolyte from said opposite surface.

Each of the supply orifices 4, 6, etc. supplies electrolyte through the plastic frame 2 on one side of the electrode 1 through a group of micro-channels 20, 21, etc., respectively. The micro-channels in each of these groups of micro-channels, i.e., micro-channels 20, micro-channels 21, etc., diverge from each other in a fan configuration. The micro-channels terminate along an edge 51 of electrolyte distribution area 40. The distance between adjacent micro-channels in the same group, when measured along edge 51, is preferably equal.

The opposite side of the electrode abuts the electrolyte collection area 41 of the plastic frame. The drainage or collecting groups of micro-channels 31, 30, converge into the respective orifices 13, 15, etc. The number of micro-channels in a group that converge to a specific drainage opening are preferably more numerous than the number of micro-channels in the supply groups. This is particularly preferred for those electrolytes in which the spent electrolyte contains gaseous decomposition products, for example, nitrogen as the decomposition product of hydrazine or ammonia. Such spent electrolytes are often in the form of a liquid-gas emulsion. Drainage of such spent electrolytes requires a relatively greater total volume of drainage micro-channel capacity than does the corresponding system of supply micro-channels for the same electrolyte.

The group of drainage micro-channels 30 are illustrated in greater detail in FIG. 2. Each of the micro-channels 30 terminates at edge 54 of area 41. The distance between adjacent micro-channels in group 30, measured along edge 54, is preferably equal. The distance between all adjacent micro-channels along edge 51 and/or 54 may be equal.

The micro-channels which together form a group, e.g., groups 21, and 30, are preferably symmetrical about a plane of symmetry perpendicular to edges 51 and 54 and passing through the center of the orifices from which the group of micro-channels diverge. The symmetry of a group of micro-channels diverging from an orifice which is closest to the side frame, e.g., orifices 3 and 13, may not be complete because there may be insufficient space for all the micro-channels which would be required to complete symmetry.

It is often preferable to equalize the pressure drop through the micro-channels, particularly those in the drainage system. To compensate for the different length of micro-channels in a group, e.g. group 30, the cross-sectional areas of the different micro-channels, i.e., 30A, 30B, 30C, 30D, 30E, 30F, and 30G, vary in proportion to their length. Since the plastic frame is a relatively thin plastic sheet and since there may be micro-channels on both sides of the plastic sheet, each of the micro-channels preferably has the same depth. They preferably have a square or rectangular cross-section. Accordingly varying cross-sectional area is preferably obtained by varying the width of the micro-channel.

The surface of the electrode 1 is preferably goffered, with bands 42, 43, and 44, each of which contains a plurality of parallel alternating projections and depressions. The adjacent bands e.g. 42, 43, and 44, form a chevron pattern. The parallel projections may be at an angle such as about 23° as disclosed in said Ser. No. 203,773 now U.S. Pat. No. 3,755,000. Such electrodes, with the depressions on one surface forming the corresponding projections on the other surface, may be formed in very thin sheets, e.g. below about 400 microns in thickness, whereas the known prior art electrodes are often about 1,000 microns thick.

The area 40 functions to distribute the supply electrolyte from the supply micro-channels to the edge 55 of the goffered surface of the electrode 1. Area 41 serves to distribute the spent electrolyte received from the edge 56 of the goffered electrode 1 into the drainage micro-channels.

The areas 40 and 41 preferably have a base level at substantially the same level as the bottoms of the abutting micro-channels. The base of areas 40 and 41 is preferably planar. The areas 40, 41 have a series of plastic projections 45, 46, etc. arranged in a staggered configuration. These plastic projections 45, 46, etc. are preferably cylindrical and preferably have flat tops at about the level of the top of the micro-channels and thus support the semi-permeable membrane which abuts the framed electrode assembly when they are stacked in a battery or cell. These plastic projections are illustrated in FIG. 2 as projections 45 and 46. It is preferred that at least some of these plastic projections should be positioned adjacent the axis of the micro-channels extending into areas 40, 41, e.g. projection 57 adjacent micro-channel 30B, to prevent preferential flow of electrolyte in the axis of a micro-channel. It is also preferred that the plastic projections be in a regular pattern; preferably staggered; with the projections preferably equidistant from adjacent projections.

A more specific example of the framed electrode of the invention follows:

The framed electrode has overall dimensions of about 165mm by 130mm. The electrode surface 2 is about 100 by 100 mm. The rims of the border areas 52 and 53 extend in each direction about 5mm. The fluid distribution areas 40 and 41 are about 3mm by 100 mm. They contain about 600 projections having a diameter of about 0.3mm and a height of about 0.2mm. The orifices are about 10mm by 5mm. The distance between the orifices and the fluid distribution areas 40 and 41 is about 7mm. The narrowest micro-channels are about 0.3mm in width. The wider micro-channels vary proportionately to their length as disclosed hereinbefore. The micro-channel depth is about 0.2mm. The overall thickness of a typical bi-polar electrode with a series of micro-channels, fluid distribution areas, etc., on both surfaces is about 400 microns.

Although the micro-channel supply and drainage systems disclosed herein and the fluid distribution areas disclosed herein have their most immediate contemplated utility in connection with the framed electrodes in fuel cells, they are also useful in supplying and draining liquid from flat (often the central) areas of thin sheets used in other apparatus such as heat exchanges, dialysers, and filters. Such apparatus is contemplated within the scope of the present invention and the disclosure hereinbefore detailed specifically in connection with framed electrodes applies thereto.

Although the embodiments illustrated hereinbefore are preferable, they can be varied within the scope of the invention. For example, the projections may have shapes other than cylindrical, e.g., they may be prismatic with a square base. The framed electrode assembly may also have a different electrolyte drainage network than that illustrated. Similarly the profile of the electrode and the various supply and drainage orifices may have different shapes, e.g., circular, oval, etc. and may be positioned differently. The framed electrode having fluid distribution areas 40, 41 could utilize systems of micro-channels different in positioning and/or configuration and/or relationship to each other than those described herein. Various changes and modifications may be made as determined by the specific structure and its size and shape selected by the designer.

What is claimed is:

1. A thin sheet apparatus comprising a central area and a frame area around said central area, said frame area containing supply orifices in one side thereof, and drainage orifices in the opposite side thereof, said frame area containing a plurality of micro-channels leading from each of said supply orifices toward said central area and adapted to supply liquid from said supply orifices to the surface of said central area, the said plurality of micro-channels leading from each of said orifices comprising a group of micro-channels with the two micro-channels forming said group diverging from each other in the direction away from said orifice each of said micro-channels comprising the said plurality of micro-channels leading from each of said orifices having a cross-sectional area varying relative to the cross-sectional area of each of the other of said micro-channels in proportion to their respective lengths, and said frame containing a fluid distribution area in said frame positioned between the supply micro-channels and the side of said electrode toward which said supply micro-channels lead and abutting said side of said electrode, said fluid distribution area having a plurality of spaced projections across the area thereof.

2. The apparatus of claim 1 wherein a group of micro-channels diverge from each of said drainage orifices toward said central area and are adapted to drain liquid from the surface of said central area; wherein the micro-channels in each of said groups diverging from the supply orifices and from the drainage orifices, are equidistant from the adjacent micro-channels in the same group when measured along a plane parallel to the side of said central area toward which said micro-channels lead; and wherein the micro-channels in each of said groups which do not diverge from an orifice positioned adjacent one side of said central area are symmetrical about a central plane perpendicular to the side of said central area toward which the group of said micro-channels lead.

3. Apparatus of claim 2 containing a fluid distribution area in said frame area positioned between the supply micro-channels and the side of said central area toward which said supply micro-channels lead and abutting said side of said central area, and containing a fluid distribution area in said frame area and positioned between the drainage micro-channels and the side of said central area and abutting said side of said central area, said fluid distribution areas having a plurality of equidistant spaced projections across the areas thereof.

4. The apparatus of claim 3 wherein the number of micro-channels comprising said plurality of micro-channels diverging from each of said drainage orifices is greater than the number diverging from each of said supply orifices.

* * * * *